No. 679,982. Patented Aug. 6, 1901.
A. P. MORROW.
FRICTION CLUTCH FOR BICYCLES.
(Application filed Feb. 6, 1899.)
(No Model.)
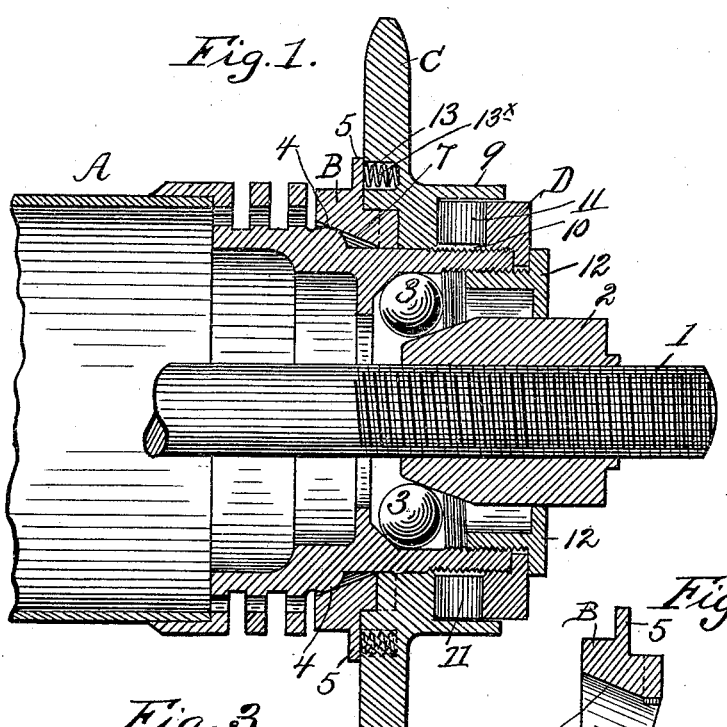
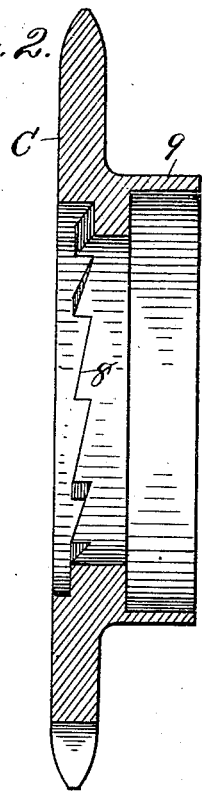
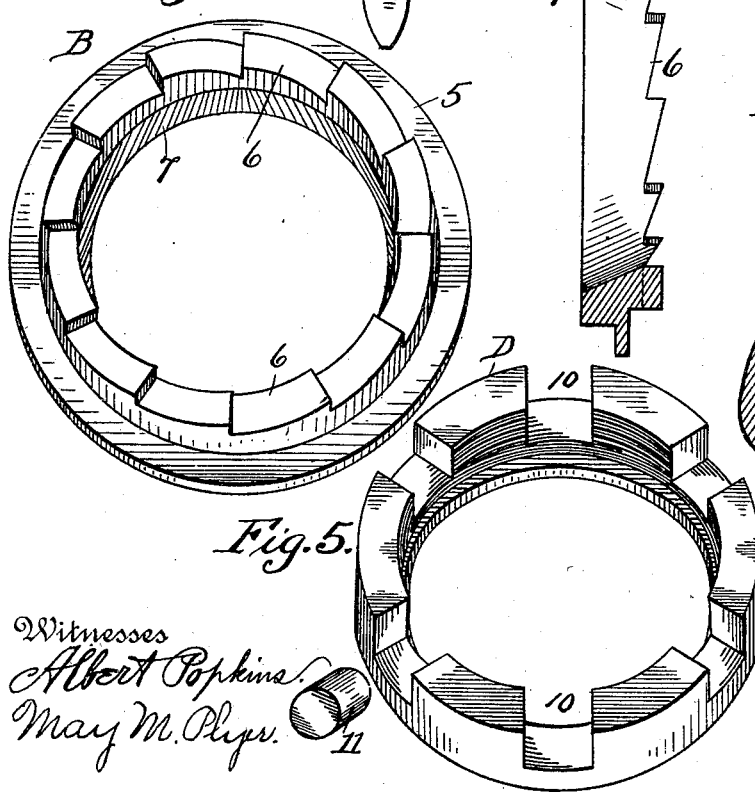
Witnesses
Albert Popkins.
May M. Plyer.
Inventor
Alexander P. Morrow
by Jas. L. Skidmore
his Attorney.

UNITED STATES PATENT OFFICE.

ALEXANDER P. MORROW, OF ELMIRA, NEW YORK, ASSIGNOR OF ONE-HALF TO H. H. FULTON, OF SAME PLACE.

FRICTION-CLUTCH FOR BICYCLES.

SPECIFICATION forming part of Letters Patent No. 679,982, dated August 6, 1901.

Application filed February 6, 1899. Serial No. 704,656. (No model.)

*To all whom it may concern:*

Be it known that I, ALEXANDER P. MORROW, a citizen of the United States, residing at Elmira, in the county of Chemung and State of New York, have invented certain new and useful Improvements in Friction-Clutches for Bicycles, &c.; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to improvements in friction-clutches of a kind by which a wheel and shaft may be held rigidly together to revolve in unison in one direction and so that when the wheel is stopped or checked in rotative movement the shaft or hub upon which it is mounted is free to continue rotation, and thus carry with it in revolution therewith whatever mechanism is mounted thereon.

It will be premised that the invention is equally applicable to shaftings of all constructions as well as to hubs of wheels driven by chain or belt connections; and, as hereinafter more fully specified, the invention is particularly adapted for use on bicycles propelled by crank-and-chain connections to a sprocket on the hub of the rear or driving wheel; and the object of the invention is to provide a clutch of the kind named and for the purposes intended which is simple in construction, durable in use, and efficient and certain in operation.

The invention therefore consists in the novel construction of parts or elements and their operative combination, as will be hereinafter fully specified and then particularly pointed out in the claims.

The invention is fully and clearly illustrated in the accompanying drawings, forming a part of this specification, and wherein—

Figure 1 is a central vertical longitudinal section of one end of a rear hub of a bicycle-wheel having my new friction-clutch applied thereto. Fig. 2 is a vertical central section of the sprocket-wheel removed from the hub and showing the friction ratchets or cams in the interior of its hub. Fig. 3 is a face view of the clutch-ring, showing the ratchets or inclines thereon to engage with coincident ratchets on the sprocket-wheel hub. Fig. 4 is a central section of the clutch-ring, showing the inclined inner surface of its rim. Fig. 5 is a detail view of the antifriction roller-ring formed with seats for such rollers. Fig. 6 is an illustration showing the invention applied to a wheel and solid shaft.

Referring to the drawings, A designates a hub of a bicycle, which in general construction may be of any approved style and make, and provided with the axle 1, with conical bearing-sleeve 2, on which the bearing-balls 3 run, substantially as shown in the drawings. On the neck of the hub is formed an annular bead or boss 4, against which or on which the inclined interior surface of the clutch engages, runs, and locks, as hereinafter specified.

B designates the clutch-ring, consisting of a suitable metal ring having an annular flange 5 to set or bear against the face of the sprocket-wheel, as indicated in the drawings, and having a longitudinally-extending annular face-flange formed with a series of inclines, cams, or ratchet-teeth 6 on its end. The interior face of the bore of the clutch-ring is inclined or flared, as at 7, the inclined surface, as above stated, engaging and running on and locking by frictional contact with the boss or bead 4, and thereby holding the interengaging parts during such engagement rigidly in position. The clutch-ring has a slight movement lengthwise of its axis to engage and release it from the boss.

C designates the sprocket-wheel mounted loosely on its bearing on the hub to turn thereon, or rather loosely thereon so as to permit the hub and the wheel carried by the hub to rotate when the sprocket-wheel is held against rotation as by the chain when stopped in its travel. The hub of the sprocket-wheel C is formed with a series of face inclines, cams, or ratchets 8, coincident to and engaging with those on the clutch-ring B. These interengaging ratchets or cam-surfaces do not ride past each other, but when engaged have a slight sliding movement on each other sufficient to slide the clutch-ring onto the boss and effect the frictional contact or impact therewith and lock the parts all together. The hub of the wheel C is provided with a horizontally-extended annular flange 9, which lies over and around the perimeter of a ring D, screwed on the end of the hub and formed with a plurality of seats 10, in which are suitably-disposed antifriction-rollers 11, standing radially to the axis of the parts and so arranged that they bear against the face of the sprocket-wheel, as indicated in Fig. 1 of the drawings. The parts are all held together by means of a cap-screw 12, the stem of which engages with interior threads in the bore of the hub and the end of which closely encircles the body of the conical bearing-sleeve to close the end of the hub, substantially as shown.

In the inner face of the sprocket-wheel on the face contiguous to the clutch-ring may be formed a number of sockets 13, in which are disposed and held expansive spiral springs $13^\times$, bearing with their outer ends against the face of the clutch-ring and tending by their action to continually restore and hold the sprocket-wheel to rotary alinement.

It will be perceived from the foregoing description, in connection with the drawings, that the operation of the clutch is as follows: The clutch-ring and the hub of the sprocket-wheel are both loosely mounted to permit the axle or hub to turn independently of them unless the clutch is locked, and the cam-surfaces of the interengaging teeth or cams being in alined union a force applied to turn the sprocket-wheel will first move it forward or in direction of the applied force and carry the ratchets or cams on its hub a short distance over the inclines of the cams of the clutch-ring, which forces the inclined bearing-surface of the clutch-ring into frictional contact with the bead or boss on the hub, and thus locks the parts together, so that the sprocket-wheel will turn the hub or axle as long as the power is rotative; but when the power which turns the sprocket-wheel is applied to hold it from rotation and stationary the teeth or cams will immediately coincide or register in engagement with the radial surface of the two parts in contact, thus releasing the clutch and permitting the wheel carried by the axle or hub to continue its rotation by momentum until the clutch is again engaged by a renewed movement of the sprocket-wheel, when the force on the hub will be again positive.

In Fig. 6 of the drawings the invention is illustrated as applied to a solid shaft, having a gear-wheel C' loosely mounted thereon. The end $s^2$ of the shaft is reduced to form a shoulder $s'$, against which the wheel C' bears, and is screw-threaded, as shown, to receive an internally-threaded sleeve $s$, formed with an integral annular boss 4. The outer surface of the wheel C' is formed with ratchet-teeth or cam-surfaces $s^3$ to coact with and engage corresponding teeth or cams on the inner surface of a clutch-ring B', which fits over the sleeve $s$ and is flared or inclined to receive the annular boss 4. The wheel C' is also provided with seats $13^b$ to receive springs $13^c$, which bear against the clutch-ring B', as shown.

Having thus described my invention, what I claim, and desire to secure by Letters Patent, is—

1. The friction-clutch herein described, comprising a rotative element formed with an integral annular boss or bead, a clutch-ring loosely mounted on the rotative element having a flaring inclined interior to engage the bead, and formed with a longitudinal annular flange having face-cams on its end, a wheel loosely mounted on the rotative element and having face-cams to engage the cams on the clutch-ring, and push it in contact with the head, whereby the rotative element, the clutch-ring and the wheel are locked together, and retaining means for preventing lateral displacement of the sprocket-wheel.

2. The friction-clutch herein described, comprising a rotative element formed with an integral annular boss or bead, a clutch-ring loosely mounted to revolve on the rotative element, formed with a flaring inclined interior to engage the bead, and formed with a vertical flange and a longitudinally-disposed annular flange having cams on its end, a wheel mounted loosely on the rotative element and having face-cams in its hub to engage the cams on the clutch-ring, springs in the said wheel to bear against the vertical flange of the clutch-ring and a retaining-ring, substantially as described.

3. The friction-clutch herein described, comprising a shaft, a sleeve mounted upon ball-bearings and formed with an integral annular boss, a wheel mounted to turn on the sleeve and having face-cams formed in its hub, and a clutch-ring on the shaft-sleeve to turn thereon and having face-cams to engage the face-cams in the hub of the wheel and formed with a flaring interior surface to engage the boss on the shaft-sleeve, whereby when the wheel is turned the cams will push the clutch-ring onto the bead and lock the wheel and the shaft together and a retaining-ring, substantially as described.

4. The friction-clutch herein described, comprising a rotative element formed with an integral annular bead, a clutch-ring loosely mounted on and having a limited longitudinal movement and formed with face-cams, a wheel loosely mounted on the rotative element and formed with face-cams to engage the face-cams on the clutch-ring, and push it into engagement with the bead and lock them together, and means for holding the wheel laterally against displacement.

5. The friction-clutch herein described, comprising a hub formed with an annular bead, a clutch-ring loosely mounted on the hub having a flaring interior surface to engage the bead, and formed with face-cams, a sprocket-wheel loosely mounted on the hub and formed with face-cams to engage the face-cams on the clutch-ring, a retaining-ring on the end of the hub formed with radially-disposed seats in its inner side, and anti-friction-rollers in the seats disposed to bear against the hub of the sprocket-wheel, substantially as described.

6. The friction-clutch herein described comprising a hub formed near one of its ends with an integral bead or boss; a clutch-ring having a flaring interior surface, a vertical annular flange and face-cams, and loosely mounted upon the hub over said boss; a sprocket-wheel also loosely mounted upon the hub beyond said boss, and having face-cams to engage the face-cams of the clutch-ring, means interposed between said sprocket-wheel and the vertical flange of the clutch-ring for forcing said wheel and ring apart and retaining means mounted on the hub.

In testimony whereof I affix my signature in presence of two witnesses.

ALEXANDER P. MORROW.

Witnesses:
EBERT M. LONG,
RALPH D. WEBSTER.